(No Model.)
T. CRANEY.
SALT GRAINER.
No. 344,633.   Patented June 29, 1886.
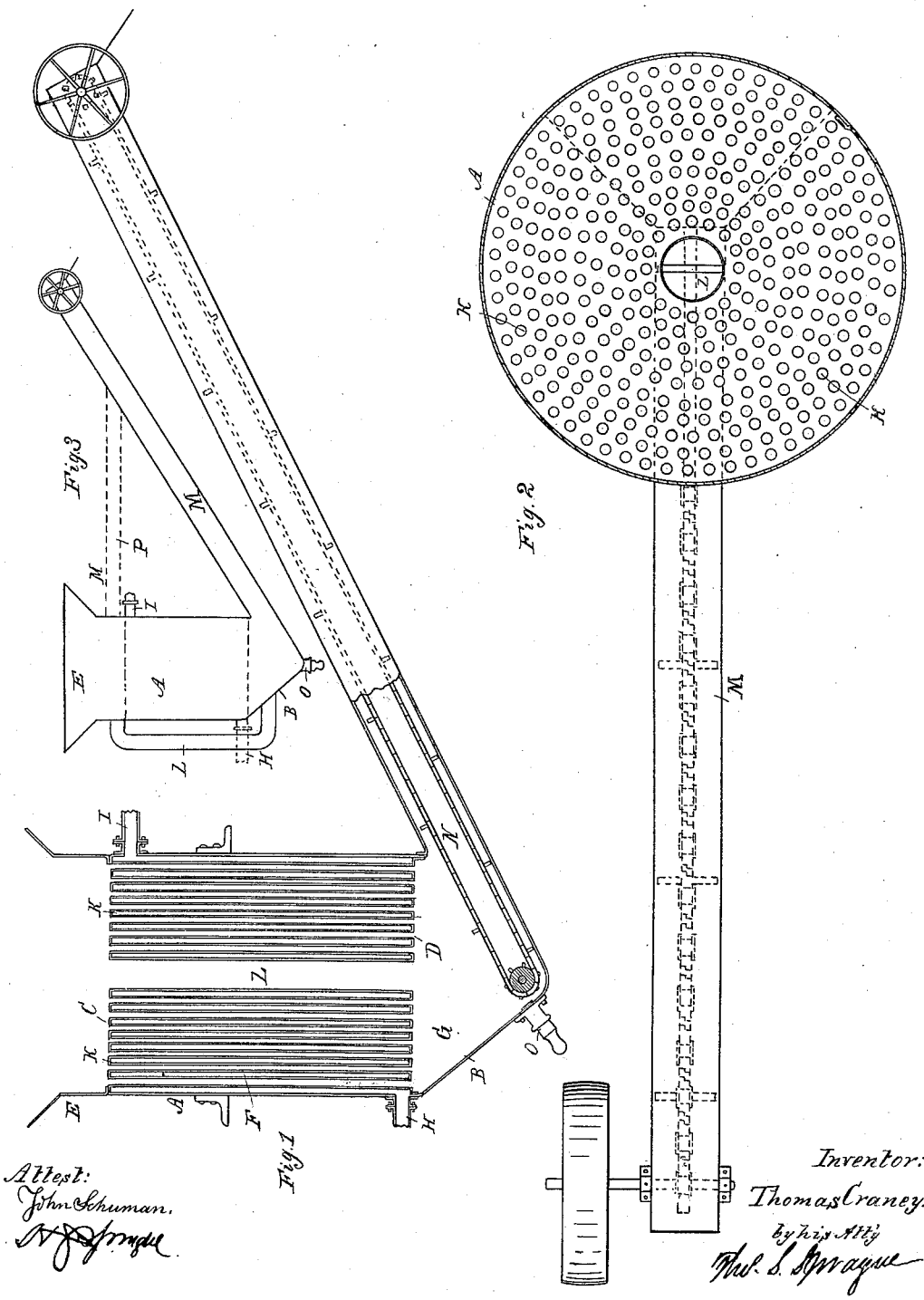
Inventor:
Thomas Craney.
by his Atty
Thos. L. Sprague
Attest:
John Schuman.

UNITED STATES PATENT OFFICE.

THOMAS CRANEY, OF BAY CITY, MICHIGAN.

SALT-GRAINER.

SPECIFICATION forming part of Letters Patent No. 344,633, dated June 29, 1886.

Application filed October 29, 1885. Serial No. 181,255. (No model.)

*To all whom it may concern:*

Be it known that I, THOMAS CRANEY, of Bay City, in the county of Bay and State of Michigan, have invented new and useful Improvements in Salt-Grainers; and I do hereby declare that the following is a full, clear, and exact description thereof, reference being had to the accompanying drawings, which form a part of this specification.

This invention relates to a new and useful improvement in the manufacture of salt from brine; and the invention consists in the novel manner of heating the brine, and, further, in the peculiar construction and arrangement of the different devices for receiving, heating, and evaporating the brine and for collecting and removing the salt, all as more fully hereinafter described.

In all kinds of vessels or so-called "grainers" in present use for evaporating brine there is a deficiency of heating-surface on account of the provision which has to be made to give the proper facilities for collecting and removing the salt. For instance, in the ordinary salt-grainer in which a series of horizontal steam-heating pipes are submerged in the line near the bottom of the grainer, it is impossible to provide an adequate amount of heating-surface without seriously interfering with the collection and removal of the salt from the grainer.

The object of my improvement is to construct a grainer for the evaporation of the brine which admits of using a large amount of heating-surface in relation to the amount of brine, and which is so arranged that simple and efficient devices for collecting and removing the salt may be combined therewith.

The object in view I have obtained by means of my improved apparatus, shown in the accompanying drawings, of which—

Figure 1 is a vertical central section. Fig. 2 is a plan view, and Fig. 3 is a vertical central section, of a modified construction specially referred to.

A is a vessel, preferably of a cylindrical shape, and provided with a conical bottom, B, and horizontal partitions C D, which subdivide the vessel into three compartments or chambers, E F G. The upper compartment, E, forms the evaporating-pan. It may be either open on top or covered with a hood connecting it with a condenser or exhaust-fan. The middle compartment, F, comprising the main portion of the vessel, constitutes a steam-heating drum provided with the steam inlets and outlets H I. The lower compartments, G, comprises the conical portion of the vessel and constitutes the settling-chamber. The upper and lower compartments communicate with each other through a series of vertical tubes, K, of small diameter, and one or more central tubes, L, of larger diameter. These pipes and tubes are closely spaced in the available room, with, however, enough space between them to provide for a free circulation of steam around them. The lower compartment, G, communicates with a lateral and upwardly inclined duct, and contains a scraper device, N, (or other lifting device,) of the kind used in connection with salt-grainers for removing the salt.

In practice the vessel being filled with brine and steam being admitted into the steam-drum F, it will be seen that the brine in the vertical tubes will be rapidly heated and a strong circulation will take place in an upward direction in the small tubes K, and in a downward direction in the large tube (or tubes) L. This forced circulation combined with the large amount of heating-surface will quickly bring the brine into a state of rapid evaporation, and as soon as the salt crystals begin to form in the pan the circulation will carry them all into the settling-chamber G, and precipitate them to the bottom, where the salt accumulates and is removed by the scraper. The rapid circulation of the brine produces an even and finely grained salt. It also exercises a scouring action, which prevents the formation of crust in all parts of the apparatus, where it would become troublesome. For the purpose of drawing off the contents of the vessel when required, a suitable outlet, O, closed with a plug, is provided at the bottom. The brine is preferably fed into the pan E, which, if desired, may be enlarged laterally, so as to increase the evaporating-surface.

The vessel A may be set in brick-work or otherwise supported as the circumstances will allow, and several apparatus may be united in a plant.

Instead of placing the pipe or pipes L in the center or within the body of the vessel A, they may be arranged on the outside of the body of the vessel, as shown in Fig. 3.

It is also within the spirit of my invention to connect the inclined duct M, by means of a pipe or duct, P, (shown in dotted lines in Fig. 3,) with the top of the vessel A, thus establishing a passage for the downward circulation of the brine.

What I claim as my invention is—

1. A brine circulating and evaporating system consisting of the following elements: an upper compartment or evaporating-pan, a lower compartment or settling-chamber, and an intermediate heating-compartment provided with a series of circulating-pipes connecting the upper and lower compartments, substantially as described.

2. A brine circulating and evaporating system consisting of the following elements: an upper compartment or evaporating-pan, a lower compartment or settling-chamber, an intermediate compartment or steam-heating drum, and a series of circulating-pipes for circulating the brine between the upper and lower compartment and heating it during its passage through the steam-drum, substantially as described.

3. A brine circulating, evaporating, and salt-collecting system, consisting of the following elements: an upper compartment or evaporating-pan, a lower compartment or settling-chamber, an intermediate heating-compartment, a series of circulating-pipes between and connecting the upper and lower compartments, and a trunk-flue extending from the lower or settling-chamber to a point above the surface of the brine in the upper compartment and containing a device for removing the salt, substantially as described.

4. A brine circulating and evaporating system consisting of a vessel divided into an upper compartment or evaporating-pan, a lower compartment or settling-chamber, an intermediate compartment or heating-chamber, a series of tubes connecting the upper and lower compartments for circulating the brine from the lower to the upper compartment and exposing it to the source of heat, and one or more tubes for circulating the brine from the upper compartment into the lower one, substantially as described.

5. In combination with the salt-making vessel A, an inclined duct leading from the bottom of the vessel to a point above the level of the brine in the vessel, said duct forming the track of a scraper device, substantially as described.

6. The vessel A, subdivided into an upper, middle, and lower compartment, communicating with each other by means of a series of vertical tubes, L, of smaller diameter, and one or more central vertical tubes, K, of larger diameter, substantially as described.

7. In an apparatus for making salt, a steam-heating drum having steam inlets and outlets, and provided with a series of vertical tubes, K L, connecting the upper and lower compartments for circulating the brine through said drum between a brine evaporating and receiving pan above the drum, and a salt-collecting compartment placed below said drum, substantially as described.

8. In an apparatus for making salt, the vessel A, consisting of an upper compartment or brine receiving and evaporating pan, a middle compartment or steam-heating drum, provided with vertical tubes K L, and a lower conical compartment or salt-collector, G, in combination with the inclined duct M, and salt-scraper N, substantially as described.

THOS. CRANEY.

Witnesses:
H. S. SPRAGUE,
CHARLES J. HUNT.